United States Patent [19]

Dougall et al.

[11] Patent Number: 5,019,903
[45] Date of Patent: May 28, 1991

[54] SPATIAL INTERPOLATION BETWEEN LINES OF A SUPERSAMPLED DIGITAL VIDEO SIGNAL IN ACCORDANCE WITH A GRADIENT VECTOR SELECTED FOR MAXIMUM MATCHING OF BLOCKS OF SAMPLES WHICH ARE OFFSET IN OPPOSITE DIRECTIONS

[75] Inventors: David A. Dougall, Basingstoke; James H. Wilkinson, Heathlands; Gavin A. Walker, Chineham, all of England

[73] Assignee: Sony Corporation, Tokyo, Japan

[21] Appl. No.: 497,514

[22] Filed: Mar. 22, 1990

[30] Foreign Application Priority Data

May 4, 1989 [GB] United Kingdom ............... 8910207

[51] Int. Cl.$^5$ ............................................. H04N 5/02
[52] U.S. Cl. ................................. 358/140; 358/105; 358/138
[58] Field of Search ............... 358/138, 105, 140, 166, 358/22, 160

[56] References Cited

U.S. PATENT DOCUMENTS

4,901,145  2/1990  Harradine et al. ................. 358/140
4,937,667  6/1990  Choquet et al. .................... 358/140

Primary Examiner—Victor R. Kostak
Attorney, Agent, or Firm—Alvin Sinderbrand; William S. Frommer

[57] ABSTRACT

In apparatus for spatially interpolating between lines of a digital video signal, to produce interpolated lines, a supersampler horizontally interpolates between samples of the signal to produce a supersampled signal consisting of the original samples and interpolated samples located between them. Block matching circuits each determine, for each sample of the supersampled signal, the extent of matching between two blocks of N×M samples (N=number of lines and M=number of samples), the blocks being vertically offset in opposite directions with respect to a line to be interpolated, and being horizontally offset in opposite directions with respect to a predetermined sample position. Each block matching circuit produces a matching value for a respective different horizontal offset. A selector responds to the matching values to select, for each sample of the line to be interpolated, from a set of gradient vectors associated with the different offsets, the vector associated with the offset that produces greatest matching between the blocks. A variable direction spatial interpolator spatially interpolates the video signal, its direction of interpolation being controlled, for each sample it generates, in accordance with the vector selected for the predetermined sample position corresponding to that generated sample.

17 Claims, 6 Drawing Sheets

SPATIAL INTERPOLATION BETWEEN LINES OF A SUPERSAMPLED DIGITAL VIDEO SIGNAL IN ACCORDANCE WITH A GRADIENT VECTOR SELECTED FOR MAXIMUM MATCHING OF BLOCKS OF SAMPLES WHICH ARE OFFSET IN OPPOSITE DIRECTIONS

BACKGROUND OF THE INVENTION

1. Field of the Invention

This invention relates to methods of and apparatus for spatially interpolating between lines of a digital video signal to produce interpolated lines.

2. Description of the Prior Art

Requirements exist for converting an interlace scanned video signal into a progressively scanned (sometimes called sequentially scanned) video signal. This involves converting interlace scanned fields of a video signal, each of which comprises the odd or even scan lines only of a frame of the video signal, into progressively scanned fields each comprising a full set of both odd and even scan lines. Examples of where such a requirement arises are where a picture is to be displayed in slow motion, and where it is required to improve the performance of a video display monitor.

One previously proposed method employs a simple technique of vertical (spatial) interpolation (filtering) to produce an interpolated (progressively scanned) field from a single input field. Another previously proposed method involves a motion adaptive technique in which a vertical filter (interpolator) is used for moving picture areas and a temporal filter (interpolator)—which interpolates between input fields—is used for static picture areas. The motion adaptive technique is advantageous over the purely vertical interpolation technique in that, in static areas, the picture represented by the progressively scanned field has full vertical resolution. However, the vertical resolution is visibly reduced in moving areas.

It is an object of the invention to provide a method of interpolation in which the degradation of vertical resolution can be reduced.

Another object of the invention is to provide an interpolation apparatus in which the degradation of vertical resolution can be reduced.

SUMMARY OF THE INVENTION

The invention provides a method of spatially interpolating between lines of a digital video signal to produce interpolated lines The method includes horizontally interpolating between samples of the video signal to produce a supersampled signal comprising the original samples and at least one interpolated sample located between each adjacent pair of original samples. Then, for each sample of the supersampled signal, the extent of matching is determined between two blocks of N×M samples of the supersampled signal (where N is the number of lines and M is the number of samples), the two blocks being vertically offset from one another in opposite directions with respect to a line to be interpolated, and being horizontally offset from one another in opposite directions with respect to a predetermined sample position. The foregoing determining step is carried out for a plurality of different horizontal offsets, including zero offset and at least one offset on each side of zero, so as to produce a respective value of the extent of matching for each horizontal offset. For each sample of the line to be interpolated, a selection is then made, from a plurality of gradient vectors each associated with a respective one of the different horizontal offsets, of the gradient vector associated with the horizontal offset that produces the greatest extent of matching between the two blocks. Spatial interpolation between samples of the video signal in different lines thereof is effected to generate samples of the interpolated line, the direction of interpolation of spatial interpolation being controlled, for each sample generated, in accordance with the gradient vector selected for the above-mentioned predetermined sample position corresponding to that generated sample.

The invention also provides apparatus for spatially interpolating between lines of a digital video signal to produce interpolated lines. The apparatus comprises supersampling means that horizontally interpolates between samples of the video signal to produce a supersampled signal comprising the original samples and at least one interpolated sample located between each adjacent pair of original samples, and a plurality of block matching circuits each operative to determine, for each sample of the supersampled signal, the extent of matching between two blocks of N×M samples of the supersampled signal (where N is the number of lines and M is the number of samples), the two blocks being vertically offset from one another in opposite directions with respect to a line to be interpolated, and being horizontally offset from one another in opposite directions with respect to a predetermined sample position. Each block matching circuit is operative as set forth above for a respective one of plurality of different horizontal offsets, including zero offset and at least one offset on each side of zero, whereby a respective value of the extent of matching is produced for each horizontal offset. Selector means is responsive to the respective values produced by the block matching circuits to select, for each sample of the line to be interpolated, from a plurality of gradient vectors each associated with a respective one of the different horizontal offsets, the gradient vector associated with the horizontal offset that produces the greatest extent of matching between the two blocks. A spatial interpolator spatially interpolates between samples of the video signal in different lines thereof, to generate samples of the interpolated line, the direction of interpolation of the spatial interpolator being variable and the spatial interpolator being connected to the selector means so that the direction of interpolation of the spatial interpolator is controlled, for each sample generated thereby, in accordance with the gradient vector selected for the above-mentioned predetermined sample position corresponding to that generated sample.

As will be explained in more detail below, the "steering" of the direction of interpolation of the spatial interpolator in accordance with the selected gradient vectors can improve vertical resolution, effectively by aligning picture edges before interpolation, whereby degradation of vertical resolution, especially in moving areas, can be reduced as compared to a case in which vertical (rather than steerable spatial) interpolation is used.

BRIEF DESCRIPTION OF THE DRAWINGS

The above and other objects, features and advantages of the invention will be apparent from the following detailed description of illustrative embodiments thereof, which is to be read in conjunction with the accompanying drawings, in which like reference signs designate like items throughout, and in which.

DESCRIPTION OF THE PREFERRED EMBODIMENTS

A preferred method embodying the invention for spatially interpolating between scan lines (hereinafter referred to more simply as "lines") of a field of an interlace scanned digital video signal to produce interpolated lines which, when combined with the original lines, produce a progressively scanned digital video signal (which can, for example, be used in a slow motion processor) will now be described.

Figure 1:
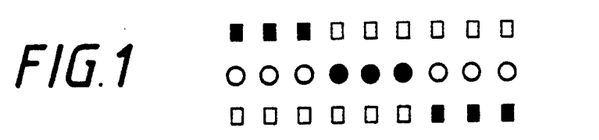
FIGS. 1 to 3 are diagrams used to explain spatial interpolation.

First, spatial interpolation will be explained in outline. FIG. 1 shows parts of three successive lines of a frame of a digital video signal. The rectangles represent pixels in two successive lines of one field (field 0) and the circles represent pixels in that line of a field of opposite polarity (field 1) that is interlaced between the two field 0 lines. The black and open pixels correspond to black and white sample values (zero and maximum luminance), respectively, the pixels representing a black picture edge or object extending diagonally downwardly from left to right.

Figure 2:
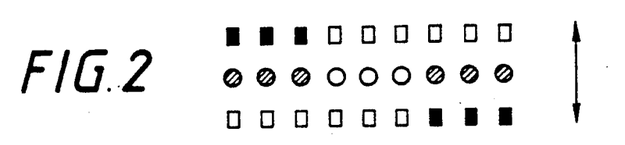

FIG. 2 shows the field 0 lines as in FIG. 1. Between them, there is shown a line comprising pixels each obtained by interpolation between (i.e. averaging of) the vertically adjacent pixels in the two field 0 scan lines (vertical interpolation): that is a line obtained by vertical interpolation (In the direction of the arrow shown in FIG. 2). The vertical interpolation results in six half-amplitude (grey) interpolated pixels shown cross-hatched. As is evident from a comparison of FIGS. 1 and 2, FIG. 2 gives the wrong result: that is, the luminance values for the illustrated pixels of the interpolated line do not correspond (as they would do in the case of correct interpolation) to those of the line of field 1 in FIG. 1. This results in vertical aliasing.

Figure 3:
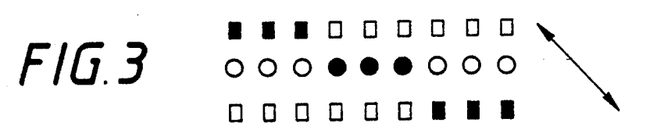

FIG. 3 shows the correct result, which can be obtained if, instead of spatially interpolating the field 0 lines in a vertical direction, they are spatially interpolated in the direction represented by an arrow in FIG. 3, which direction at least approximately follows the picture edge. This direction will hereinafter be referred to as a gradient vector and the way in which an optimum gradient vector can be derived for each pixel of each interpolated line, to define an optimum direction or angle of spatial interpolation to improve vertical resolution, will now be described.

Figure 4:
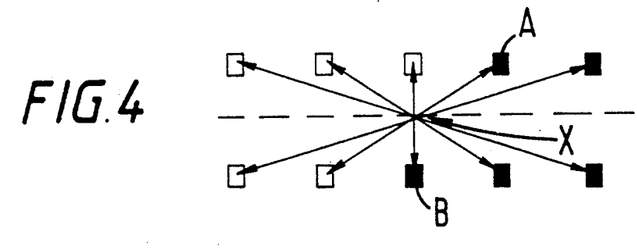
FIG. 4 is a diagram used to explain the concept of gradient vectors used in variable direction spatial interpolation.

FIG. 4 shows two successive lines of a field, between which an interpolated line is to be generated on a pixel by pixel basis, i.e. on a sample-by-sample basis, bearing in mind that the field forms part of a digital video signal comprising successive samples in the form of digital words) representing the successive pixels of successive fields. The interpolated line is shown in FIG. 4 by a dotted line. The pixels of the interpolated line are, of course, to be formed at positions vertically aligned with the pixels of the field lines. In the method embodying the invention, the gradient vector is measured in several different directions, each passing through the location of the pixel to be interpolated, for each pixel to be interpolated, and that one of the measured gradient vectors (the minimum gradient vector) which gives rise to the minimum absolute difference in pixel luminance values is selected as that appropriate to employ for interpolation of the pixel in question. By way of example, if the minimum gradient vector for the interpolated pixel position shown at X in FIG. 4 is to be ascertained, the five gradient vectors shown in FIG. 4 by respective arrows can be measured. One of the gradient vectors is vertical and the other four comprise two like pairs inclined in opposite directions with respect to the vertical. Clearly, more or less than five gradient vectors can be measured. In fact, in the method embodying the invention, in which "supersampling" (described below) is preferably employed, nine gradient vectors are measured.

The method embodying the invention employs a technique in which matching of a block or window (array) of pixels is used. The method employs the philosophy of measuring gradient vectors with respect to each interpolated pixel position, as opposed to the possible alternative technique of determining where an interpolated pixel appropriate to values of the "real" (original) pixels should go, which approach can lead to ambiguity. In other words, the philosophy involves trying to determine where a pixel has come from rather than where it is going to. More specifically, the technique involves determining, for each sample, the extent of matching between two blocks of N×M samples (where N is the number of lines and M is the number of samples). The two blocks are vertically offset from one another in opposite directions with respect to a line to be interpolated. Also, the two blocks are horizontally offset from one another in opposite directions with respect to a predetermined sample position in the interpolated line. The foregoing operation of determining the extent of matching is carried out for a plurality of different horizontal offsets (corresponding to a plurality of different gradient vectors) so as to produce a value for the extent of matching (hereinafter referred to as "match value") for each horizontal offset. The maximum match value gives rise to the minimum gradient vector and that gradient vector is selected for interpolation of the pixel in question.

Figure 5:
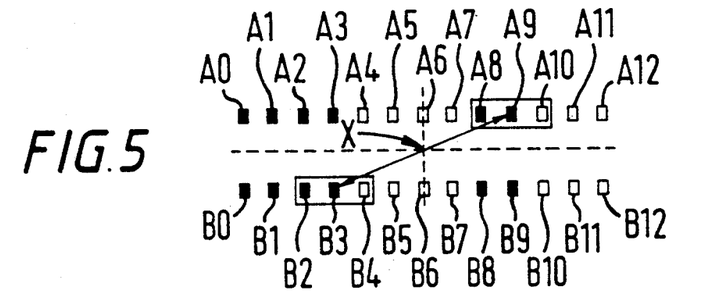
FIGS. 5 and 6 are diagrams used to explain the concept of block matching employed in a preferred spatial interpolation method and apparatus embodying the invention to select a gradient vector.

The foregoing will now be explained in more detail with reference to FIG. 5, for the case in which a block where N=1 and M=3 is employed for estimation of the minimum gradient vector for the pixel to be interpolated at a position X. First, a block comprising pixels A0 to A2 is compared with a block comprising pixels B10 to B12. More specifically, the absolute pixel luminance differences |A0−B10|, |A1−B11| and |A2−B12| are calculated and then averaged. (As will be seen, since the pixels A0 to A2 are black and the pixels B10 to B12 are white, the result is a high absolute difference signal and, therefore, a high gradient vector, the gradient vector in this case being the line joining the pixels A1 and B11 (and passing through the interpolated pixel position X).) Then, a block comprising the pixels A1 to A3 is compared with a block comprising the pixels B9 to B11; then a block comprising the pixels A2 to A3 with a block comprising the pixels B8 to B10; and so on up to comparison of a block comprising the pixels A10 to A12 with a block comprising the pixels B0 to B2. (In fact, there is no need for the different block matching operations to be carried out in sequence, as suggested above. In fact, for reasons of available time, it will generally be preferred in practice to carry out the plural block matching operations simultaneously.). That one of the block matching operations that gives rise to the maximum match value (and therefore the minimum gradient vector) is selected.

It is appropriate to mention at this point that the different horizontal offsets between the different pairs of blocks that are matched can be measured in units of shift, where shift is the horizontal displacement (in units of pixel spacing) of each block (in opposite senses) from the central position in which the blocks are vertically aligned with one another (shift=0). It will be seen that, in the case of FIG. 5, the shift can vary from +5 (in which case the blocks are disposed in one sense at opposite ends of the search area, which is assumed limited to those pixels represented in FIG. 5) to −5 (in which case the blocks are disposed in the opposite sense at opposite ends of the search area). In the case of the blocks shown framed in FIG. 5, the shift is +3 (adopting the (arbitrary) convention that shifting the lower block to the left (and the upper block to the right) is a positive shift and shifting the blocks in the opposite sense is a negative shift).

One of the first considerations in selecting a block matching algorithm is the size of the block to be used. Thus, if a small window is used, it is possible that the blocks will match at more than one shift value whereby uncertainty as to which is the correct minimum gradient vector (or even selection of the wrong gradient vector) may occur. An example of how this can occur can be seen by referring again to FIG. 5. It is immediately evident from FIG. 5 that the luminance values of all vertically aligned samples of the two field lines are the same whereby the correct minimum gradient vector for the pixel position X is the vertical gradient vector (shift=0), namely that passing through the pixels A6 and B6. In this regard, it will be seen that the block comprising the pixels A5 to A7 matches completely the block comprising the pixels B5 to B7 whereby these blocks produce a 100% match value and therefore a zero averaged absolute difference and, thus (correctly), a zero gradient vector. This would (correctly) lead to the generation of a white pixel at X. However, the same applies wholly incorrectly to the blocks (shown framed) comprising the pixels A8 to A10 and B2 to B4, respectively, where the shift is +3 and the gradient vector is the illustrated line joining the pixels A9 and B3, which would lead wholly incorrectly) to the generation of a black pixel at X.

Figure 6:
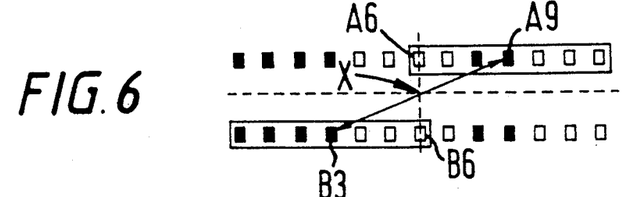

The foregoing problem can be avoided if a larger block is used, for example a block of the size N=1 and M=7, as shown in FIG. 6. It will be seen that, in this case, the (larger) blocks (shown framed) having the same shift (+3) as those shown framed in FIG. 5 do not produce a good match. In this case, only those blocks centered on the pixels A6 and B6 produce a good match whereby there is no ambiguity concerning the minimum gradient vector.

It would therefore seem from the foregoing that the best approach is to use the largest possible window. However, the inventors believe this not to be the best approach. In this regard, they believe that, in areas of fine detail, small pixel shifts may be lost by using large windows. A compromise as regards window size therefore seems called for. However, rather than using a single block of a size which is a compromise between the extremes of false matching (small block) and loss of fine detail large block), the inventors have devized a technique according to which a plurality of blocks of different sizes are used whereby the foregoing compromise does not have to be made. Specifically, the step of determining the match value, for at least some of the horizontal offsets (shifts), is carried out for a plurality of blocks of respective different sizes, and the resultant plural match values for each horizontal offset are combined, to form a single match value for each horizontal offset, prior to the step of selecting the minimum gradient vector in accordance with the match values for the different horizontal offsets.

Figure 7:
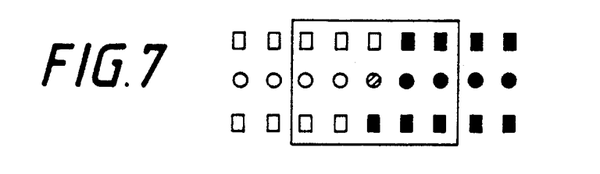
FIGS. 7 to 9 are diagrams used to explain a supersampling technique used in the preferred method and apparatus embodying the invention.

A problem that may arise in the case of block matching carried out exactly as set forth above will now be described. It may perhaps be appreciated from a very careful study of FIG. 4 that a single pixel shift from one field line to the other, that is where the minimum gradient (which in this case does not pass through the pixel X) is from a pixel A to a pixel B, will not be detected. No test is made along that gradient, since it does not pass through the interpolated pixel position X. As an example, consider the picture edge shown in FIG. 7, which shows part of three successive lines of a frame of a digital video signal, the rectangles representing pixels in two successive field lines of one polarity (e.g. field 0 lines) and the circles representing pixels in the line of a field of opposite polarity that is interlaced between the foregoing two field lines. To enable this problem to be overcome, the digital video signal is horizontally "supersampled". That is to say, a horizontal interpolation between horizontally adjacent pairs of samples is effected (using a simple horizontal filter) to produce, between each such pair, an interpolated pixel at half pixel spacing, the interpolated pixels being added into the original data (sample stream) so as thereby effectively to produce a supersampled signal having double the sample (data) rate of the original signal. Block matching is then effected between the samples of the supersampled signal (rather than between only the samples of the original signal).

Figure 8:
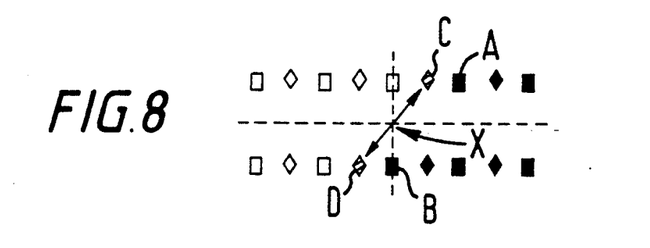

FIG. 8 shows FIG. 4 modified by the addition of the horizontally interpolated samples into the two field lines, which additional samples are represented by diamonds. The directions (gradient vectors) for which testing is effected are all of those five shown in FIG. 4 plus the additional four that pass through the pixel position X and a pair of the additional (interpolated) samples. One of these four additional gradient vectors passes through the additional pixels shown at C and D, which gradient vector provides the best match. That is, in contrast to the non-supersampled arrangement, the supersampled arrangement permits a single pixel shift from one field line to the next to be detected. Tests of nine gradient vectors are therefore effected, corresponding to shifts (horizontal offsets) of from −4 to +4.

Figure 9:
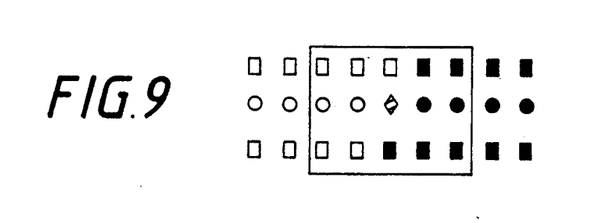

FIG. 9 shows the interpolated frame (progressively scanned field) output obtained when the supersampled signal of FIG. 8 has been spatial interpolated and then "subsampled", that is converted back to the original data rate by discarding the horizontally interpolated samples to leave only those samples that correspond in horizontal position to the samples of the original digital video signal.

In the examples given above, the vertical extent or size of the blocks that are matched was in each case only one line, that is N=1, and the blocks were vertically offset from one another (by one line) in opposite directions with respect to the line to be interpolated. However, as explained above, N can be greater than one, provided that the blocks remain vertically offset from one another in opposite directions with respect to the line to be interpolated. In fact, in the preferred method embodying the invention, it is preferred to employ blocks in which N=3 (that is, blocks having a vertical extent of 3 lines).

The preferred method embodying the invention will now be summarized.

Firstly, the incoming data (digital video signal) is supersampled horizontally as explained above, to increase the horizontal data rate by a factor of two, enabling half pixel offsets to be calculated.

For each sample thereof, the supersampled signal is then subjected to the block matching operation described above. Specifically, for at least some of the nine shifts from −4 to +4, block matching is effected for a plurality of windows of different sizes, more particularly for windows where N×M=3×9, 3×7, 3×5 and 3 ×3. The absolute differences between the related samples of the two blocks are calculated for each block size and for each shift. The average difference values for each shift and each block size are normalized for the window size to produce a normalized absolute difference (NAD) for each shift. The NADs for each shift are averaged to produce an average NAD for each shift.

The allowable shifts applied for each window size follow the rule $$-M/2 <= SHIFT <= +M/2.$$

The gradient vector associated with the shift producing the smallest average NAD (that is, the best block match value) is selected as being the appropriate one to use for the current interpolated sample position, and an interpolated sample is spatially interpolated by means of a spatial interpolator (filter) that is "steered" by the selected gradient vector, that is configured to effect spatial filtration in a direction corresponded to the selected gradient vector.

It will be appreciated that, in some instances, the selected gradient vector may be erroneous, which error could be visible in the picture. To suppress such erroneous isolated gradient vectors, the sequence of gradient vectors produced by the above-described selection operation may be passed through a low pass filter, for example a two-dimensional finite impulse response (2D FIR) filter, whereby each gradient vector as passed to the spatial interpolator is a weighted sum of a spatial array of gradient vectors so that any spurious error will be suppressed, that is reduced or even eliminated.

It may happen that, even after processing of the selected gradient vectors by means of a low pass filter as just described, the spatial interpolation will occasionally produce an erroneous interpolated output sample, which could lead to a dot defect appearing on the picture. The possibility of this happening can be reduced or eliminated by testing each interpolated sample, to see if it has a value that might reasonably be expected, by comparing it with the values of horizontally adjacent interpolated samples, that is outgoing samples in the same interpolated line. This may be done as will now be described with reference to FIG. 10.

Figure 10:
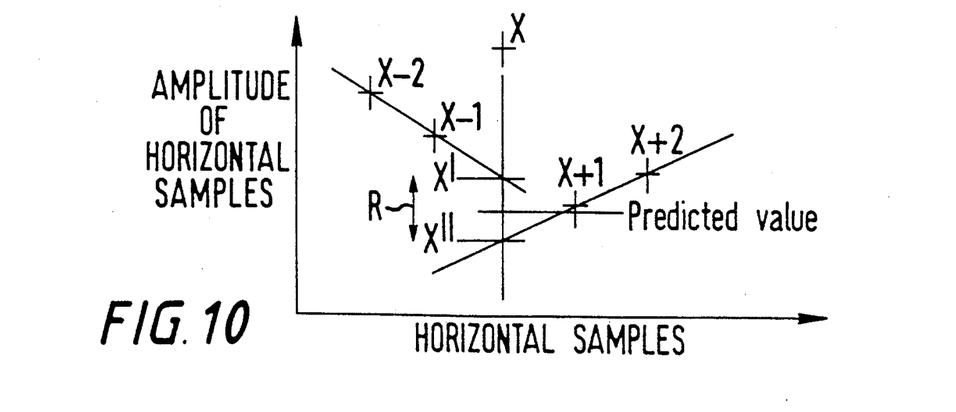
FIG. 10 is a graph used to explain a horizontal interpolated sample prediction technique used in the preferred method and apparatus.

The prediction operation to see whether the actual value of each interpolated sample X "fits" into the samples horizontally surrounding it comprises using the difference between the values of the two preceding samples X−2 and X−1 to calculate a predicted value X′ for the pixel X, by linear extrapolation, and doing likewise with the values of the two following samples X+1 and X+2 to calculate a predicted value X″. The average of the calculated (predicted) values X′ and X″ may be taken as an expected (predicted) value for the sample X. If the actual value of the sample X does not lie within a range R determined by the predicted value (which range R is shown in FIG. 10 as being bounded by the values X′ and X″, but which could be larger), the actual value will be rejected. The actual value can then be replaced by (or mixed with) a sample generated by vertical filtering (interpolation) between appropriately disposed samples of the digital video signal.

The method described above can be used for spatially interpolating the whole of a progressively scanned field. However, since temporal filtering is (as mentioned above) known generally to produce satisfactory results in static picture areas, it is possible to combine the method described above with a temporal filtering arrangement. In this event, the local degree of motion of the picture represented by the digital video signal might be sensed by motion sensor means (known per se), a temporal filter would be provided, and, if the degree of motion is less than a predetermined value, the interpolated samples generated as described above would be replaced by (or mixed with) samples produced by the temporal filter.

An apparatus for carrying out the above-described preferred method embodying the invention will now be described. The apparatus is shown in block diagram form in FIG. 11. A field interlaced digital video signal in the form of 8-bit luminance data (samples) is inputted via a bus 10 to a supersampler 11 where it is supersampled as described above to produce a supersampled signal (as described above), having twice the sample or data rate, on a bus 12. Three line delay circuits 14, 16 and 18 are connected in tandem, as shown, to the bus 12. Consequently, at any one time, supersampled signals corresponding to four successive lines of a field are present on the bus 12, and on busses 20, 22 and 24 (connected to outputs of the line delay circuits 14, 16 and 18, respectively), respectively.

The busses 12, 20, 22 and 24 are connected to respective inputs of each of nine shift detectors (block matching circuits) SD(−4) to SD(+4). Although, to simplify the drawing, it appears from FIG. 11 that the shift detectors SD(−4) to SD(+4) are connected in cascade, it should be appreciated that the four inputs of each of the shift detectors are connected directly to the respective busses 12, 20, 22 and 24 whereby the shift detectors all operate in parallel.

Figure 11:
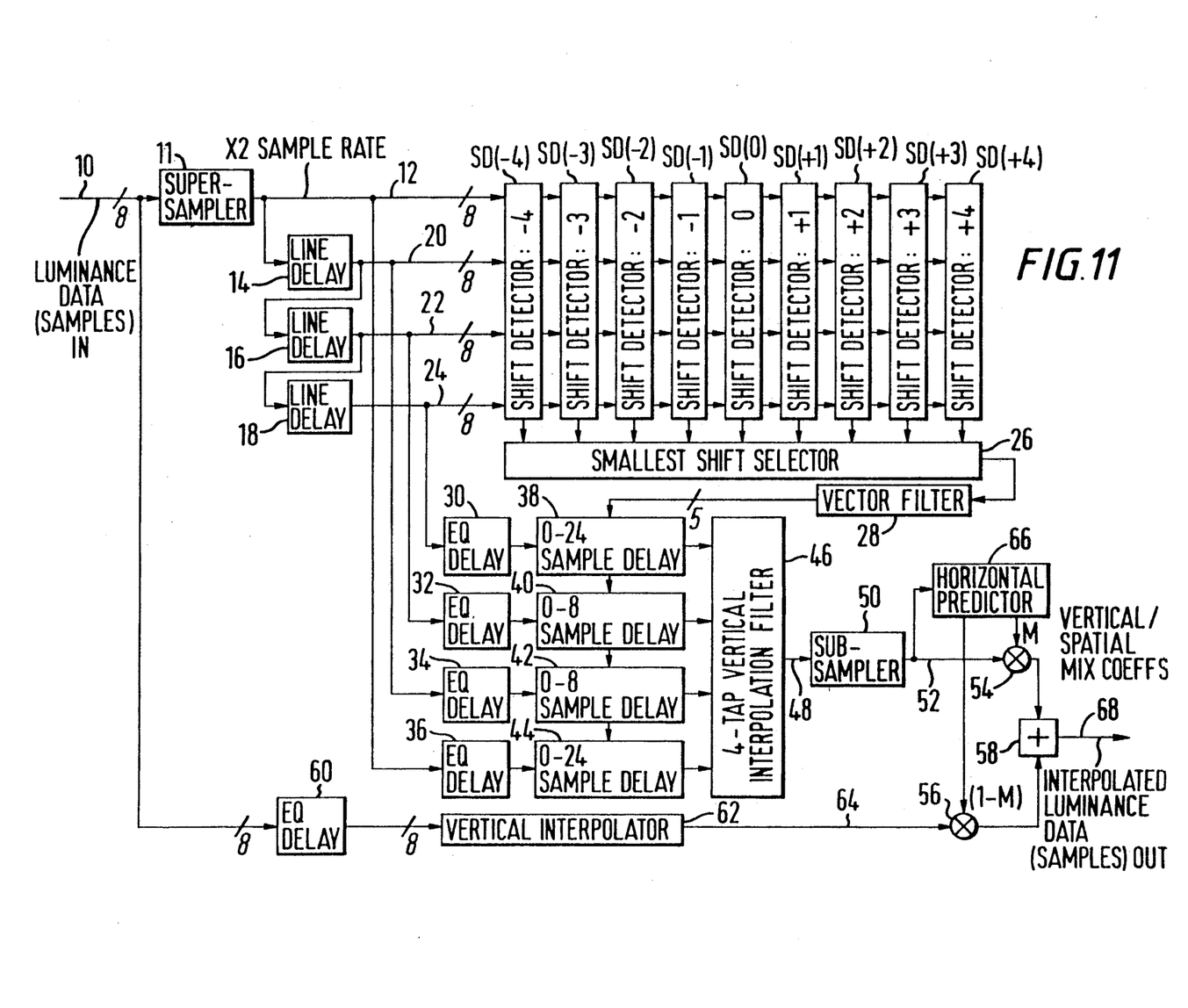
FIG. 11 is a block diagram of the preferred spatial interpolation apparatus embodying the invention.

As described in more detail below, each of the shift detectors SD(−4) to SD(+4) performs the above-described block matching operation for a respective one of the shifts (horizontal offsets) −4 to +4. Specifically, for its associated shift, each shift detector SD(−4) to SD(+4) effects block matching for at least one of the blocks where N×M=3×9, 3×7, 3×5 and 3×3, calculates the absolute difference between the related samples of the two blocks for each block size, normalizes the absolute difference values for their respective block sizes to produce a normalized absolute difference value (NAD), and averages the NADs to produce an average NAD for the associated shift.

The average NADs from the respective nine shift detectors SD(−4) to SD(+4) are supplied to a smallest shift selector 26 which, as described above, selects that one of the nine gradient vectors associated with the respective nine shifts that is associated with the shift having the smallest average NAD.

The selected gradient vector is outputted to a vector filter (low pass filter) 28 which, as described above, acts to suppress spurious errors in the sequence of selected gradient vectors.

The busses 12, 20, 22 and 24 are connected via respective equalizing delay circuits 30, 32, 34 and 36 (which act to preserve the correct temporal relationship between input and output) to respective variable sample delay circuits 38, 40, 42 and 44. The circuits 38 and 44 can produce a delay of 0 to 24 samples and the circuits 40 and 42 can produce a delay of 0 to 8 samples. Outputs of the variable sample delay circuits 38, 40 42 and 44 are connected to respective inputs of a 4-tap vertical interpolation filter 46 which, in a manner well known per se in the art, comprises four multipliers that multiply the four inputs by respective Weighting coefficients and means for summing the outputs of the multipliers to produce an output sample.

It will be apparent to those skilled in the art that the vertical interpolation filter 46, in conjunction with the line delay circuits 14, 16 and 18 and the variable sample delay circuits, acts as a variable direction (gradient) spatial interpolation filter that spatially interpolates between samples of the four supersampled lines of the digital video signal on the busses 12, 20, 22 and 24 to produce samples of an interpolated line disposed midway between the lines represented by the samples on the busses 20 and 22. Further, the direction (gradient) of spatial interpolation is determined, for each sample, by the values selected for the number of sample delays selected in the variable sample delay circuits 38, 40, 42 and 44, and nine different gradients (corresponding to shifts of −4 to +4) can be selected.

Figure 12:
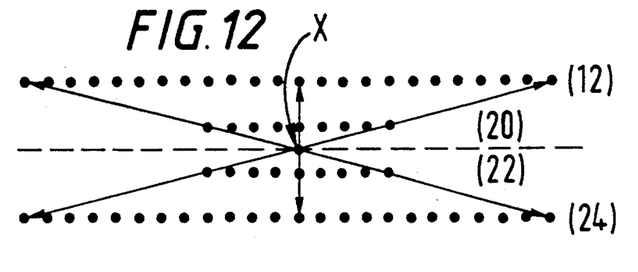
FIG. 12 is a diagram used to explain the operation of a variable direction spatial filter forming part of the apparatus of FIG. 11.

This may be more readily comprehended from an inspection of FIG. 12, in which the 25 dots in each of the upper and lower lines represent the positions (but not, in this case, the values) of pixels of the lines on the busses 12 and 24, respectively, the nine dots in each of the two lines between the upper and lower lines represent pixels of the lines on the busses 20 and 22, the dotted line represents the interpolated line, and X represents the position of the sample being interpolated. Of the nine possible gradient vectors, three only (namely the two extreme ones (shifts of +4 and −4) and the central (vertical) one (shift of 0)) are shown in FIG. 12. It can also be seen from FIG. 12 why the variable sample delay circuits 38 and 44 need to have a delay of 0 to 24 samples and the variable sample delay circuits 40 and 42 need to have a delay of 0 to 8 samples. Thus, to achieve one of the extreme gradient vectors (those corresponding to the shifts of +4 and −4) the circuits 38, 40, 42 and 44 need to be set to sample delays of 0, 0, 8 and 24, respectively, while to achieve the other of the extreme gradient vectors the circuits 38, 40, 42 and 44 need to be set to sample delays of 24, 8, 0 and 0, respectively. To switch between the nine different gradient vectors, the circuits 40 and 42 have to be switched in increments of one sample delay while the circuits 38 and 44 have to be switched in increments of 3 sample delays.

The sample delay circuits 38, 40, 42 and 44 are switched between the nine different gradient vectors in accordance with the selected gradient vector as applied thereto by the selector 26 via the filter 28. (The means for switching the sample delay circuits 38, 40, 42 and 44, the construction of which will be evident, is not shown). Thus, there is produced at the output of the filter 46, on a bus 48, a series of samples of a line interpolated between the lines currently present on the busses 20 and 22, each of such samples having been spatially interpolated in a direction appropriate thereto as determined by a selected gradient vector produced by the shift detectors (block matching circuits) SD(−4) to SD(+4) and the selector 26.

Since the lines on the busses 12, 20, 22 and 24 are supersampled, so also is the interpolated line produced on the bus 48. Therefore, the bus 48 is connected to a subsampler 50 which, as described above, converts the output interpolated line back to the input data rate by discarding the horizontally interpolated (sub-pixel spaced) samples to leave only those samples that correspond in horizontal position to the samples of the input digital video signal.

The subsampled output signal from the subsampler 50 is connected via a bus 52 to one input of a mixer constituted by a ratio element 54, a ratio element 56 and a summation circuit 58. The bus 10, carrying the input digital video signal, is connected to another input of the mixer via an equalising delay circuit 60, a vertical interpolator (filter) 62 and a bus 64. A horizontal predictor 66 monitors the signal on the bus 52 and is operative to mix the variable spatially interpolated signal on the bus 52 and the vertically interpolated signal on the bus 64 by applying a ratio signal M (not greater than unity) to the ratio element 54 and a ratio signal (1−M) to the ratio element 56. The horizontal predictor 66 operates as described above with reference to FIG. 10. Thus, if the value of a spatially interpolated sample emerging from the subsampler 50 is within the predicted range R, M is set to unity and that sample appears on a bus 68 connected to an output of the mixer, more specifically an output of the summation circuit 58. If, however, the value of a spatially interpolated sample emerging from the subsampler 56 is outside of the predicted range R, M is set to zero and a vertically interpolated sample emerging from the vertical interpolater 62 is supplied to the bus 68.

The above-described mixer could, as may be appreciated from the foregoing, be replaced by a switch. However, the use of a mixer is preferred since it reduces the possibility of switching artifacts being visible. In this regard, a mixer affords the possibility of a slow crossfading between the spatially and vertical signals to be achieved in the event of operation of the horizontal predictor 66 by gradually changing the value of M from unity to zero (or vice versa) over several samples. Also, the use of a mixer affords the possibility of, for example, mixing proportions of the two signals, by controlling the value of M to be intermediate zero and unity, for example as a function of the relationship between the actual and predicted value of each spatially interpolated sample outputted by the subsampler 50.

The interpolated lines produced on the bus 68 are then interlaced (by means not shown) with the lines from which they were interpolated to produce a sequentially scanned field.

Figure 13:
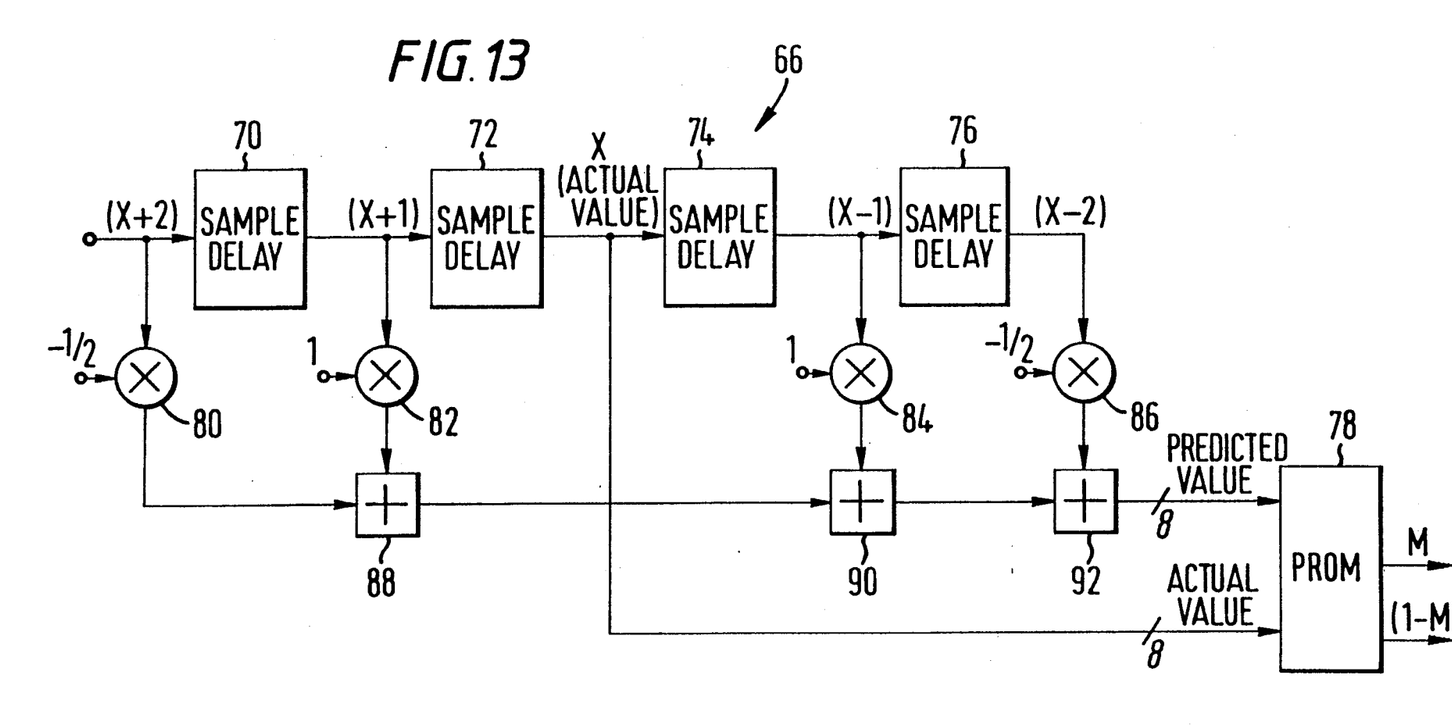
FIG. 13 is a block diagram of a horizontal predictor forming part of the apparatus of FIG. 11.

One possible form of implementation of the horizontal predictor 66 is shown in FIG. 13. Four sample delay circuits 70, 72, 74 and 76 are connected in tandem so that the samples (X+2), (X+1), X, (X−1) and (X−2) are available where shown. The (actual) value of X is passed to one input of a programmable read only memory (PROM) 78 which is programmed to produce values of M (and (1−M)) in accordance with the relationship between the actual and predicted values of X. Multipliers 80, 82, 84 and 86 and summation elements 88, 90 and 92 are connected as shown to produce the predicted value for X and supply it to the PROM 78, the weighting coefficients applied to the multipliers being such (as shown) as to produce a predicted value equal to $((X-1)-(X-2)/2)+((X+1)-(X+2/2))$.

Figure 14:
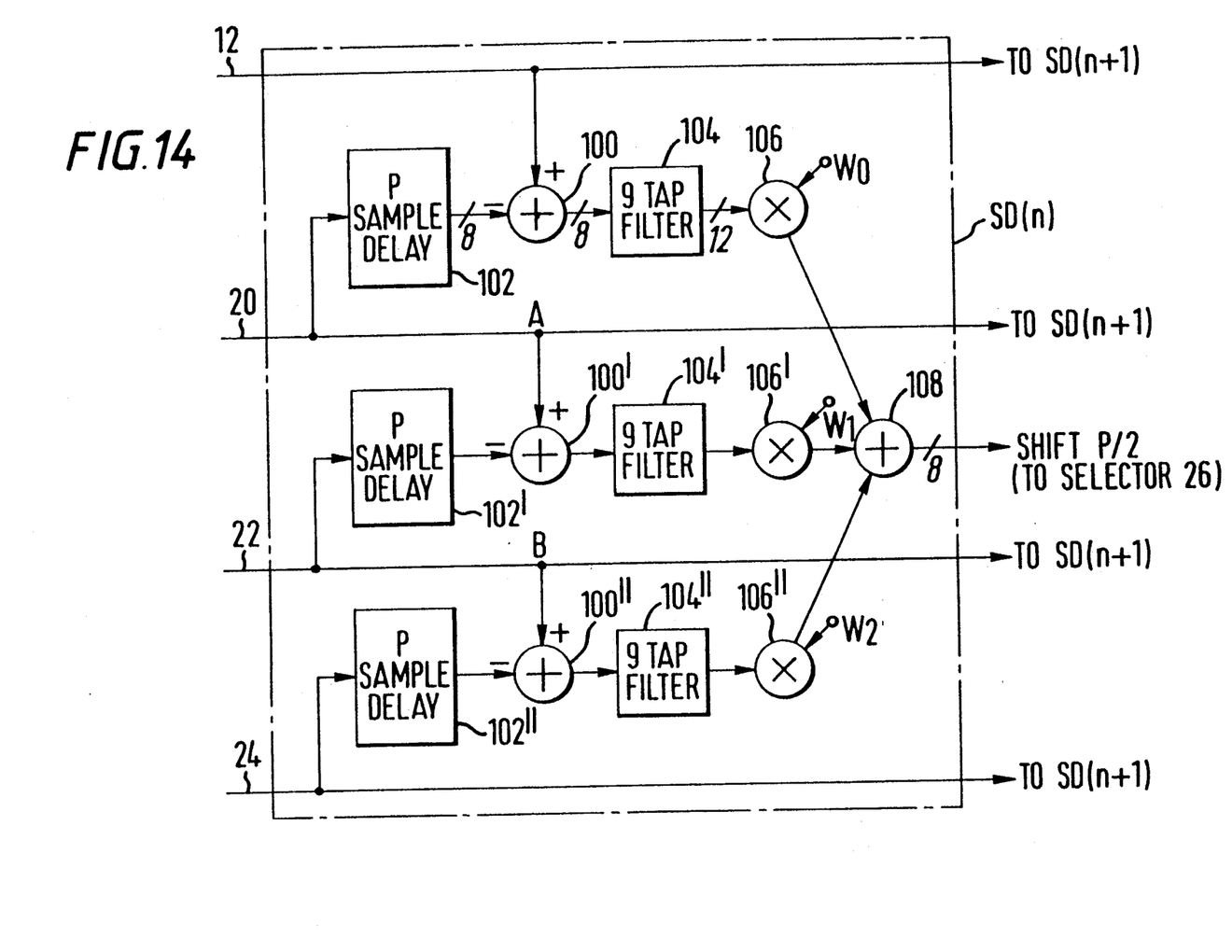
FIG. 14 is a block diagram of shift detectors (block matching circuits) forming parts of the apparatus of FIG. 11.

As promised above, the shift detectors (block matching circuits) SD(−4) to SD(+4) will now be described in more detail. FIG. 14 is a block diagram of any one, identified as SD(n), of the shift detectors. The shift detector SD(n) comprises three like parts. The upper one of the three parts, connected between the busses 12 and 20, comprises a summation element 100 having a (+) input connected to the bus 12 and a (−) input connected to the bus 20 via a P sample delay circuit 102. (In fat, as explained below, for some of the shift detectors the delay circuit 102 is connected between the (+) input of the summation circuit 100 and the bus 12.) Since each non-zero shift involves shifting both blocks (in opposite senses) from the zero shift position, the value of P must be equal to twice the shift. Or, in other words, the shift=P/2.

An output of the summation circuit 100 is connected to a 9-tap filter 104. In a manner well known per se, the filter 104 comprises eight sample delay circuits (not known) which provide the required nine taps. The nine taps are fed to respective multipliers (not shown) to which respective weighting coefficients are supplied. The outputs of the multipliers are summed to derive the output of the filter, which is passed to a multiplier 106 to which a weighting coefficient W0 is supplied.

The other two parts of the shift detector SD(n) are of substantially identical construction to the upper part described above and therefore need not be described again. The components of that part connected between the busses 20 and 22 are designated by the same reference signs as the upper part, but with prime superscripts, and the components of the part connected between the busses 22 and 24 are designated by the same reference signs as the upper part, but with double prime superscripts.

Outputs of the multipliers 106, 106' and 106" are connected to respective inputs of a summation element 108, the output of which constitutes the output of the shift detector SD(n) and is connected, as shown in FIG. 11, to a respective input of the selector 26.

It is to be noted that the multipliers 106, 106' and 106" are supplied with respective different weighting coefficients W0, W1 and W2. This feature enables alteration of the effect of each of the three lines over which absolute differences are to be calculated on the result. Should such alteration not be required, the multipliers 106, 106' and 106" may be omitted and the outputs of the filters 104, 104' and 104" may be connected directly to the summation element 108.

Absolute differences between pixels in the two blocks to be matched are calculated by the summation elements 100, 100' and 100". (It may be desirable to include a PROM (not shown) at this stage to produce a "magnitude" output.) Each shift (and therefore each gradient vector) that is analysed requires a different value for the P sample delay circuits 102, 102' and 102" inserted before the (−) (or (+)) inputs to the summation elements 100, 100' and 100" (In each of the shift detectors SD(n), the value of P will be the same in each of the three circuits 102, 102' and 102".) The values for the different shift detectors SD(n) are set forth in the following table.

TABLE

| SD(n) | SHIFT | DELAY (P) (=P/2) | LOCATION OF DELAY ON (−) INPUT | LOCATION OF DELAY ON (+) INPUT |
|---|---|---|---|---|
| SD(−4) | −4 | 8 | × | |
| SD(−3) | −3 | 6 | × | |
| SD(−2) | −2 | 4 | × | |
| SD(−1) | −1 | 2 | × | |
| SD(0) | 0 | 0 | (no delay on either input) | |
| SD(+1) | +1 | 2 | | × |
| SD(+2) | +2 | 4 | | × |
| SD(+3) | +3 | 6 | | × |
| SD(+4) | +4 | 8 | | × |

Each of the 9-tap filters 104, 104' and 104" sums the pixel difference values from the associated summation element 100, 100' and 100" and scales (weights) then appropriately, as explained below. After summation in the summation element 108, there is produced an 8-bit number which is effectively the normalised absolute difference (NAD) for the one or more of the four block sizes (N×M=3×3, 3×5, 3×7 and 3×9) employed for the particular shift associated with the particular shift detector SD(n).

Figure 15:
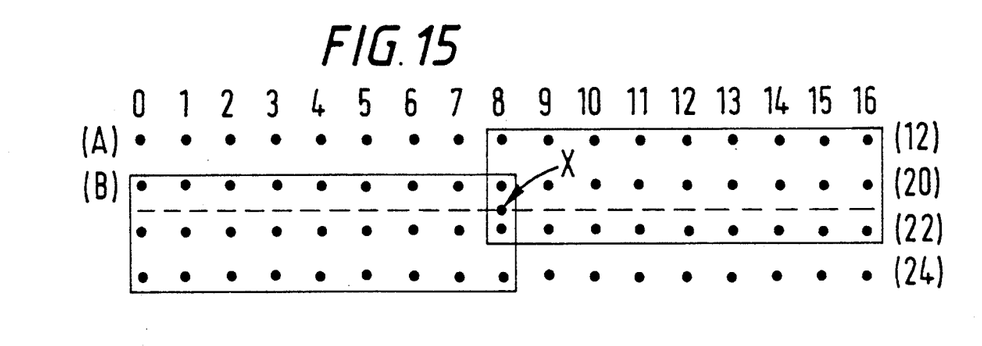
FIG. 15 is a diagram used to explain the operation of the shift detectors.

The block matching operation performed by the shift detectors SD(n) can more readily be comprehended from an inspection of FIG. 15, in which the 17 dots (identified as 0 to 16) in the four respective lines represent the positions (but not, in this case, the values) of pixels on the busses 12, 20, 22 and 24, respectively, the dotted line represents the line to be interpolated, and X represents the position of the sample being interpolated. For the case of a shift of +4 and a 3×9 block, the two blocks to be matched are shown framed. If the pixels of the lines on the busses 12 and 20 are designated A and B, it will be seen that, in this case, the upper part of the shift detector SD(−4) has to form nine absolute differences $|A8-B0|$, $|A9-B1|$, $|A10-B2|$, $|A11-B3|$, $|A12-B4|$, $|A13-B5|$, $|A14-B6|$, $|A15-B7|$ and $|A16-B8|$. it then has to sum these differences and, to normalise them for the block size, divide the sum by 27(=3×9). (The middle and lower parts of the shift detector SD(−4) perform like exercises for the lines on the busses 20, 22 and 22, 24, respectively.) In view of the above-mentioned rule ($-M/2 <= \text{SHIFT} <= +M/2$) relating the shift and block size, in the case of maximum shift (+4) only the 3×9 block (and not the smaller blocks) are matched. However, for the smaller shifts, blocks of different sizes have to be matched. It might at first be thought necessary to replicate the circuitry shown in FIG. 14 for each block size. However, this is not in fact necessary, because, since the number of lines N in the block, that is the vertical dimension of the block, is the same (3) for all the block sizes, the smaller blocks can be accessed by employing a sub-set (7, 5 or 3) of the taps of the 9-tap filters 104, 104' and 104''. That is to say, all of the blocks of different sizes can be matched (and the average of their NADs taken) by the same circuitry by appropriate weighting of the taps of the 9-tap filters 104, 104' and 104''.

More specifically, the absolute differences to be formed for the respective different shift detectors SD(n) are, in concept, defined by the equations set forth below, in which the four terms in SHIFT 0 and SHIFT 1 represent, respectively, matching over all four block sizes (3×3, 3×5, 3×7 and 3×9), the three terms in SHIFT 2 represent, respectively, matching over the block sizes 3×5, 3×7 and 3×9, the two terms in SHIFT 3 represent, respectively, matching over the block sizes 3×7 and 3×9 and, as explained above, the single term in SHIFT 4 represents matching over the block size 3×9 only. The block size to which each term relates will be evident by the fraction at the beginning of the term, since multiplication by 1/9, 1/15, 1/21 and 1/27 implies normalisation of the following absolute difference sum for a 3×3 (=9), 3×5 (=15), 3×7 (=21) and 3×9 (=27) block, respectively.

| | | |
|---|---|---|
| SHIFT 0: (P=0) | 1/9 | ($\|A7 - B7\| + \|A8 - B8\| + \|A9 - B9\|$) |
| | + 1/15 | ($\|A6 - B6\| + \|A7 - B7\| + \|A8 - B8\| + \|A9 - B9\| + \|A10 - B10\|$) |
| | + 1/21 | ($\|A5 - B5\| + \|A6 - B6\| + \|A7 - B7\| + \|A8 - B8\| + \|A9 - B9\| + \|A10 - B10\| + \|A11 - B11\|$) |
| | + 1/27 | ($\|A4 - B4\| + \|A5 - B5\| + \|A6 - B6\| + \|A7 - B7\| + \|A8 - B8\| + \|A9 - B9\| + \|A10 - B10\| + \|A11 - B11\| + \|A12 - B12\|$) |
| SHIFT +1: (P=2) | 1/9 | ($\|A8 - B6\| + \|A9 - B7\| + \|A10 - B8\|$) |
| | + 1/15 | ($\|A7 - B5\| + \|A8 - B6\| + \|A9 - B7\| + \|A10 - B8\| + \|A11 - B9\|$) |
| | + 1/21 | ($\|A6 - B4\| + \|A7 - B5\| + \|A8 - B6\| + \|A9 - B7\| + \|A10 - B8\| + \|A11 - B9\| + \|A12 - B10\|$) |
| | + 1/27 | ($\|A5 - B3\| + \|A6 - B4\| + \|A7 - B5\| + \|A8 - B6\| + \|A9 - B7\| + \|A10 - B8\| + \|A11 - B9\| + \|A12 - B10\| + \|A13 - B11\|$) |
| SHIFT +2: (P=4) | 1/15 | ($\|A8 - B4\| + \|A9 - B5\| + \|A10 - B6\| + \|A11 - B7\| + \|A12 - B8\|$) |
| | + 1/21 | ($\|A7 - B3\| + \|A8 - B4\| + \|A9 - B5\| + \|A10 - B6\| + \|A11 - B7\| + \|A12 - B8\| + \|A13 - B9\|$) |
| | + 1/27 | ($\|A6 - B2\| + \|A7 - B3\| + \|A8 - B4\| + \|A9 - B5\| + \|A10 - B6\| + \|A11 - B7\| + \|A12 - B8\| + \|A13 - B9\| + \|A14 - B10\|$) |
| SHIFT +3: (P=6) | 1/21 | ($\|A8 - B2\| + \|A9 - B3\| + \|A10 - B4\| + \|A11 - B5\| + \|A12 - B6\| + \|A13 - B7\| + \|A14 - B8\|$) |
| | + 1/27 | ($\|A7 - B1\| + \|A8 - B2\| + \|A9 - B3\| + \|A10 - B4\| + \|A11 - B5\| + \|A12 - B6\| + \|A13 - B7\| + \|A14 - B8\| + \|A15 - B9\|$) |
| SHIFT +4: (P=8) | 1/27 | ($\|A8 - B0\| + \|A9 - B1\| + \|A10 - B2\| + \|A11 - B3\| + \|A12 - B4\| + \|A13 - B5\| + \|A14 - B6\| + \|A15 - B7\| + \|A16 - B8\|$) |

The above equations can be substantially simplified, by combining like absolute differences that appear in different terms, to form the equations set forth below.

| | | |
|---|---|---|
| SHIFT 0: | 0.037 | [$\|A4 - B4\| + \|A12 - B12\|$] |
| | + 0.085 | [$\|A5 - B5\| + \|A11 - B11\|$] |
| | + 0.1513 | [$\|A6 - B6\| + \|A10 - B10\|$] |
| | + 0.2624 | [$\|A7 - B7\| + \|A8 - B8\| + \|A9 - B9\|$] |
| SHIFT +1: | 0.037 | [$\|A5 - B3\| + \|A13 - B11\|$] |
| | + 0.085 | [$\|A6 - B4\| + \|A12 - B10\|$] |
| | + 0.1513 | [$\|A7 - B5\| + \|A11 - B9\|$] |
| | + 0.2624 | [$\|A8 - B6\| + \|A9 - B7\| + \|A10 - B8\|$] |
| SHIFT +2: | 0.037 | [$\|A6 - B2\| + \|A14 - B10\|$] |
| | + 0.085 | [$\|A7 - B3\| + \|A13 - B9\|$] |
| | + 0.1513 | [$\|A8 - B4\| + \|A9 - B5\| + \|A10 - B6\| + \|A11 - B7\| + \|A12 - B8\|$] |
| SHIFT +3: | 0.037 | [$\|A7 - B1\| + \|A15 - B9\|$] |
| | + 0.085 | [$\|A8 - B2\| + \|A9 - B3\| + \|A10 - B4\| + \|A11 - B5\| + \|A12 - B6\| + A13 - B7\| + \|A14 - B8\|$] |
| SHIFT +4: | 0.037 | [$\|A8 - B0\| + \|A9 - B1\| + \|A10 - B2\| + \|A11 - B3\| + \|A12 - B4\| + \|A13 - B5\| + \|A14 - B6\| + \|A15 - B7\| + \|A16 - B8\|$] |

The foregoing equations were derived for the upper one of the three parts of each of the shift detectors SD(0) to SD(+4), namely those parts that form the absolute differences for the upper lines of the blocks for shifts of 0 to +4. However, since the operations performed by the middle and lower parts (on the middle and lower lines of the blocks) are the same, the equations apply to those parts also. (That is, those parts can be of identical construction to the upper part.) Further, equations for the shifts of −1 to −4 will be identical to those for +1 to +4, except that each "A" term becomes a "B" term and vice versa. That is, for example, "|A7−B5|" becomes "|B7−A5|".

Thus, the averaged NADs can be produced by the shift detectors SD(n) by so constructing the 9-tap filters 104, 104' and 104", in accordance with the equations set forth above, that the appropriate absolute differences (produced by the sample delay circuits 102, 102' and 102") are picked off and summed together.

Each shift detector SD(n) thus produces an 8-bit number which is effectively the averaged NAD for its respective shift value for the respective different block sizes. Thus, the selector 26 is presented with nine 8-bit numbers (maximum value 255) each representing the averaged NAD for a particular one of the nine shifts (−4 to +4). The selector 26 compares these nine numbers with each other until it identifies which one is the smallest, and thus ascertains which shift value produces the best match. It then assigns a value of −4 to +4 to the gradient vector in dependence on which shift produces the smallest absolute difference value, that is the best match.

It was explained above that the apparatus shown in FIG. 11 treats luminance values. The luminance values may of course be separated from a composite color signal. In that case, the question arises of what to do with the chrominance component. Various possibilities arise. The chrominance component could simply be ignored (i.e. not interpolated), or, because it should follow the luminance component, it could be subjected to vertical interpolation only or be subjected to multi-directional spatial interpolation using the same gradient vectors as generated (by the apparatus described above) for the luminance component. It would, however, be possible to treat the luminance and chrominance components separately, each in a respective one of two apparatuses as described above.

In the case of a component color signal, e.g. a composite signal decoded into R/G/B or Y/U/V components, it would be possible to treat each component in a respective one of three apparatuses as described above.

Figure 16:
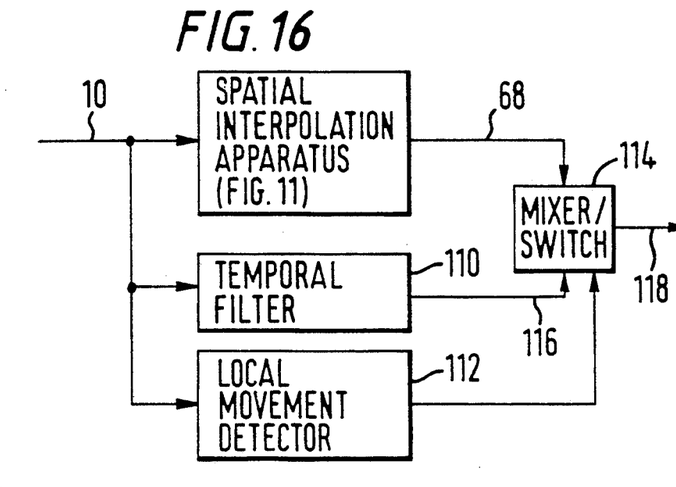
FIG. 16 shows a modification that can be made to the apparatus of FIG. 11.

It was mentioned above that it would be possible to sense local picture movement and use temporal filtering in static picture areas. A modification of the apparatus of FIG. 11 that enables this to be accomplished is shown in FIG. 16. The input digital video signal to the spatial interpolation apparatus of FIG. 11 on the bus 10 is supplied also to a temporal filter 110 (comprising at least one field store) and to a local movement detector 112. The bus 68 from the output of the spatial interpolation apparatus is connected to one input of a device 114 which may be a switch or a mixer (constructed, for example, similarly to that constituted by the components 54, 56 and 58 in FIG. 11). An output bus 116 leading from the temporal filter 110 is connected to another input of the device 114. A mixed or switched output is produced on a bus 118. The signal on the bus 118 could as mentioned above, be substantially wholly a spatially interpolated signal in moving picture areas and substantially wholly a temporally interpolated (filtered) signal in static picture areas, though it might be possible to mix the two signals in respective proportions over some or the whole of a picture area.

The apparatus described above may be modified in various ways For example, although in the arrangement described the subsampling is effected after spatial interpolation, it being convenient to do so since supersampled signals corresponding to plural lines are available from the line delay circuits, this is not in principle essential. Subsampling could, in principle, be performed prior to spatial interpolation.

Further, although a 4-tap filter is used to perform spatial interpolation, it is possible to use instead a 2-tap filter. However, it is preferred to use as many taps as possible in order to afford greater accuracy in the interpolation.

Although, in the arrangement described above, tests are made in nine gradient vector directions, a lesser or greater number of directions could be employed. In general, subject to constraints of design and economy, the greater the number of directions the better, since increasing the number of directions allows lower sloping edges to be detected.

It should also be noted that it is possible to extend the supersampling to produce more than one intermediate (interpolated) sample between adjacent pairs of samples of the original digital video signal, which affords greater accuracy in sub-pixel shifts between lines.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of spatially interpolating between lines of a digital video signal to produce interpolated lines, the method comprising the steps of:

horizontally interpolating between samples of said video signal in each of said lines to produce a supersampled signal comprising the original samples and at least one interpolated sample located between each adjacent pair of original samples;

determining, for each sample of said supersampled signal, the extend of matching between two blocks of N×M samples of said supersampled signal (where N is the number of lines and M is the number of samples), said two blocks being vertically offset from one another in opposite directions with respect to a line to be interpolated, and being horizontally offset from one another in opposite directions with respect to a predetermined sample position, said step of determining being carried out for a plurality of different horizontal offsets, including zero offset and at least one offset on each side of zero, so as to produce a respective value of the extent of matching for each of said horizontal offsets;

selecting, for each sample of the line to be interpolated, from a plurality of gradient vectors each associated with a respective one of said different horizontal offsets, the gradient vector associated with the horizontal offset that produces the greatest extent of matching between said two blocks;

spatially interpolating between samples of said video signal in different lines thereof to generate samples of the interpolated line; and in said step of spatially interpolating, controlling the direction of interpolation, for each sample generated, in accordance with the gradient vector selected for said predetermined sample position corresponding to that generated sample.

2. A method according to claim 1, which spatially interpolates between the lines of a field of a digital video signal to form interpolated lines disposed midway between the lines of said field.

3. A method of spatially interpolating between lines of a digital video to produce interpolated lines, the method comprising the steps of:

horizontally interpolating between samples of said video signal to produce a supersampled signal comprising the original samples and at least one interpolated sample located between each adjacent pair of original samples;

determining, for each sample of said supersampled signal, the extent of matching between two blocks of N×M samples of said supersampled signal (where N is the number of lines and M is the number of samples), said two blocks being vertically offset from one another in opposite directions with respect to a line to be interpolated, and being horizontally offset from one another in opposite directions with respect to a predetermined sample position, said step of determining being carried out for a plurality of different horizontal offsets, including zero offset and at least one offset on each side of zero, so as to produce a respective value of the extent of matching for each of said horizontal offsets;

selecting, for each sample of the line to be interpolated, from a plurality of gradient vectors each associated with a respective one of said different horizontal offsets, the gradient vector associated with the horizontal offset that produces the greatest extent of matching between said two blocks;

spatially interpolating between samples of said video signal in different lines thereof to generate samples of the interpolating line;

in said step of spatially interpolating, controlling the direction of interpolation, for each sample generated, in accordance with the gradient vector selected for said predetermined sample position corresponding to that generated sample;

said step of selecting being carried out for each sample of said supersampled signal and said step of spatially interpolating being performed upon said supersampled signal, whereby a sample of an interpolated line is generated for each sample of said supersampled signal; and discarding the generated samples that do not correspond in horizontal position to the original samples of said digital video signal.

4. A method of spatially interpolating between lines of a digital video signal to produce interpolated lines, the method comprising the steps of:

horizontally interpolating between samples of said video signal to produce a supersampled signal comprising the original samples and at least one interpolated sample located between each adjacent pair of original samples;

determining, for each sample of said supersampled signal, the extent of matching between two blocks of N×M samples of said supersampled signal (where N is the number of lines and M is the number of samples), said two blocks being vertically offset from one another in opposite directions with respect to a line to be interpolated, and being horizontally offset from one another in opposite directions with respect to a predetermined sample position, said step of determining being carried out for a plurality of different horizontal offsets, including zero offset and at least one offset on each side of zero, so as to produce a respective value of the extent of matching for each of said horizontal offsets, said step of determining being carried out, for at least some of said horizontal offsets, for a plurality of said blocks of respective different sizes; combining the resultant plural values of the extent of matching for each horizontal offset to form a single value of the extent of matching for each horizontal offset;

selecting, for each sample of the line to be interpolated, from a plurality of gradient vectors each associated with a respective one of said different horizontal offsets, the gradient vector associated with the horizontal offset that produces the greatest single value of the extent of matching between said two blocks;

spatially interpolating between samples of said video signal in different lines thereof to generate samples of the interpolated line; and in said step of spatially interpolating, controlling the direction of interpolation, for each sample generated, in accordance with the gradient vector selected for said predetermined sample position corresponding to that generated sample.

5. A method according to claim 4, wherein said plurality of blocks of different sizes all have the same value of N and have respective different values of M.

6. A method according to claim 5, wherein there are four blocks of different sizes, the values of M for the four blocks being 3, 5, 7 and 9, respectively.

7. A method of spatially interpolating between lines of a digital video signal to produce interpolated lines, the method comprising the steps of:

horizontally interpolating between samples of said video signal to produce a supersampled signal comprising the original samples and at least one interpolated sample located between each adjacent pair of original samples;

determining, for each sample of said supersampled signal, the extent of matching between two blocks of N×M samples of said supersampled signal (where N is the number of lines and M is the number of samples), said two blocks being vertically offset from one another in opposite directions with respect to a line to be interpolated, and being horizontally offset from one another in opposite directions with respect to a predetermined sample position, said step of determining being carried out for a plurality of different horizontal offsets, including zero offset and at least one offset on each side of zero, so as to produce a respective value of the extent of matching for each of said horizontal offsets;

selecting, for each sample of the line to be interpolated, from a plurality of gradient vectors each associated with a respective one of said different horizontal offsets, the gradient vector associated with the horizontal offset that produces the greatest extent of matching between said two blocks;

spatially interpolating between samples of said video signal in different lines thereof to generate samples of the interpolated line;

in said step of spatially interpolating controlling the direction of interpolation for each sample generated in accordance with the gradient vector selected for said predetermined sample position corresponding to that generated sample;

predicting the value of a generated sample of an interpolated line from values of other generated samples in the same line; and, if the actual value of the generated samples does not fall within a range of values determined by the predicted value, at least partially replacing the generated sample by a sample generated by vertically filtering between samples of the digital video signal.

8. A method of spatially interpolating between the lines of a field of a digital video signal to form interpolated lines disposed midway between the lines of said field, the method comprising the steps of:

horizontally interpolating between samples of said video signal to produce a supersampled signal comprising the original samples and at least one interpolated sample located between each adjacent pair of original samples;

determining, for each sample of said supersampled signal, the extent of matching between two blocks of $N \times M$ samples of said supersampled signal (where N is the number of lines and M is the number of samples), said two blocks being vertically offset from one another in opposite directions with respect to a line to be interpolated, and being horizontally offset from one another in opposite directions with respect to a predetermined sample position, said step of determining being carried out for a plurality of different horizontal offsets, including zero offset and at least one offset on each side of zero, so as to produce a respective value of the extent of matching for each of said horizontal offsets;

selecting, for each sample of the line to be interpolated, from a plurality of gradient vectors each associated with a respective one of said different horizontal offsets, the gradient vector associated with the horizontal offset that produces the greatest extent of matching between said two blocks;

spatially interpolating between samples of said video signal in different lines thereof to generate samples of the interpolated line;

in said step of spatially interpolating controlling the direction of interpolation for each sample generated in accordance with the gradient vector selected for said predetermined sample position corresponding to that generated sample;

sensing the local degree of motion of a picture represented by said digital video signal; and, if the sensed degree of motion is less than a predetermined value, at least partially replacing the generated samples of the interpolated lines by samples obtained by temporally filtering said digital video signal.

9. Apparatus for spatially interpolating between lines of a digital video signal to produce interpolated lines, the apparatus comprising:

supersampling means operative to horizontally interpolate between samples of the video signal in each of said lines to produce a supersampled signal comprising the original samples and at least one interpolating sample located between each adjacent pair of original samples;

a plurality of block matching circuits each operative to determine, for each sample of the supersampled signal, the extent of matching between two blocks of $N \times M$ samples of the supersampled signal (where N is the number of lines and M is the number of samples), said two blocks being vertically offset from one another in opposite directions with respect to a line to be interpolated, and being horizontally offset from one another in opposite directions with respect to a predetermined sample position, each of said block matching circuits being operative to as set forth for a respective one of a plurality of different horizontal offsets, including zero offset and at least one offset on each side of zero, whereby a respective value of the extent of matching is produced for each of said horizontal offsets;

selector means responsive to said respective values produced by said block matching circuits to select, for each sample of the line to be interpolated, from a plurality of gradient vectors each associated with a respective one of said different horizontal offsets, the gradient vector associated with the horizontal offset that produces the greatest extent of matching between said two blocks;

a spatial interpolator operative to spatially interpolate between samples of said video signal in different lines thereof so as to generate samples of the interpolated line, the direction of interpolation of said spatial interpolator being variable; and means connecting said interpolator to said selector means so that the direction of said interpolation of said spatial interpolator is controlled, for each samples generated thereby, in accordance with the gradient vector selected for said predetermined sample position corresponding to that generated sample.

10. Apparatus for spatially interpolating between lines of a digital video signal to produce interpolating lines, the apparatus comprising:

supersampling means operative to horizontally interpolate between samples of the video signal to produce a supersampled signal comprising the original samples and at least one interpolated sample located between each adjacent pair of original samples;

a plurality of block matching circuits each operative to determine, for each sample of the supersampled signal, the extent of matching between two blocks of $N \times M$ samples of the supersampled signal (where N is the number of lines and M is the number of samples), said two blocks being vertically offset from one another in opposite directions with respect to a line to be interpolated, and being horizontally offset from one another in opposite directions with respect to a predetermined sample position, each of said block matching circuits being operative to as set forth for a respective one of a plurality of different horizontal offsets, including zero offset and at least one offset on each side of zero, whereby a respective value of the extent of matching is produced for each of said horizontal offsets;

selector means responsive to said respective values produced by said block matching circuits to select, for each sample of the line to be interpolated, from a plurality of gradient vectors each associated with a respective one of said different horizontal offsets, the gradient vector associated with the horizontal offset that produces the greatest extent of matching between said two blocks;

a spatial interpolator operative to spatially interpolate between samples of said video signal in different lines thereof, to generate samples of the interpolated line, the direction of interpolation of said spatial interpolator being variable;

means connecting said spatial interpolator to said selector means so that the direction of said interpolation of said spatial interpolator is controlled, for each sample generated thereby, in accordance with the gradient vector selected for said predetermined sample position corresponding to that generated sample;

said selector means being operative to carry out said selection for each sample of said supersampled signal and said spatial interpolator being operative to perform said spatial interpolator upon said supersampled signal, whereby said spatial interpolator generates a sample of an interpolated line for each sample of said supersampled signal; and subsampling means operative to discard samples generated by said spatial interpolator that do not correspond in horizontal position to the original samples of said digital video signal.

11. Apparatus for spatially interpolating between lines of a digital video signal to produce interpolated lines, the apparatus comprising:

supersampling means operative to horizontally interpolate between samples of the video signal to produce a supersampled signal comprising the original samples and at least one interpolated sample located between each adjacent pair of original samples;

a plurality of block matching circuits each operative to determine, for each sample of the supersampled signal, the extent of matching between two blocks of N×M samples of the supersampled signal (where N is the number of lines and M is the number of samples), said two blocks being vertically offset from one another in opposite directions with respect to a line to be interpolated, and being horizontally offset from one another in opposite directions with respect to a predetermined sample position, each of said block matching circuits being operative as set forth for a respective one of a plurality of different horizontal offsets, including zero offset and at least one offset on each side of zero, whereby a respective value of the extent of matching is produced for each of said horizontal offsets, at least some of said block matching circuits being operative to determine the extent of matching for a plurality of said blocks of respective different sizes and to combine the resultant plural values of the extent of matching for the associated horizontal offset to form a single value of the extent of matching for each of said horizontal offsets;

selector means responsive to said respective values produced by said block matching circuit to select, for each sample of line to be interpolated, from a plurality of gradient vectors each associated with a respective one of said different horizontal offsets, the gradient vector associated with the horizontal offset that produces the greatest single value of the extent of matching between said two blocks;

a spatial interpolator operative to spatially interpolate between samples of said video signal in different lines thereof, to so as generate samples of the interpolated line, the direction of interpolation of said spatial interpolator being variable; and means connecting said spatial interpolator to said selector means so that the direction of said interpolation of said spatial interpolator is controlled, for each sample generated thereby, in accordance with the gradient vector selected for said predetermined sample position corresponding to that generated sample.

12. Apparatus according to claim 11, wherein said plurality of blocks of different sizes all have the same value of N and have respective different values of M.

13. Apparatus according to claim 12, wherein there are four blocks of different sizes, the values of M for the four blocks being 3, 5, 7 and 9, respectively.

14. A method of spatially interpolating between lines of a digital video signal to produce interpolated lines, the method comprising the steps of:

horizontally interpolating between samples of said video signal to produce a supersampled signal comprising the original samples and at least one interpolated sample located between each adjacent pair of original samples;

determining, for each sample of said supersampled signal, the extent of matching between two blocks of N×M samples of said supersampled signal (where N is the number of lines and is equal to 3 and M is the number of samples), said two blocks being vertically offset from one another in opposite directions with respect to a line to be interpolated, and being horizontally offset from one another in opposite directions with respect to a predetermined sample position, said step of determining being carried out for a plurality of different horizontal offsets, including zero offset and at least one offset on each side of zero, so as to produce a respective value of the extent of matching for each of said horizontal offsets;

selecting, for each sample of the line to be interpolated, from a plurality of gradient vectors each associated with a respective one of said different horizontal offsets, the gradient vector associated with the horizontal offset that produces the greatest extent of matching between said two blocks;

spatially interpolating between samples of said video signal in different liens thereof to generate samples of the interpolated line; and in said step of spatially interpolating, controlling the direction of interpolation for each sample generated in accordance with the gradient vector selected for said predetermined sample position corresponding to that generated sample.

15. A method of spatially interpolating between lines of a digital video signal to produce interpolated lines, the method comprising the steps of:

horizontally interpolating between samples of said video signal to produce a supersampled signal comprising the original samples and at least one interpolated sample located between each adjacent pair of original samples;

determining, for each sample of said supersampled signal, the extent of matching between two blocks of N×M samples of said supersampled signal (where N is the number of lines and M is the number of samples), said two blocks being vertically offset from one another in opposite directions with respect to a line to be interpolated, and being horizontally offset from one another in opposite directions with respect to a predetermined sample position, said step of determining being carried out for a plurality of different horizontal offsets, including zero offset and at least one offset on each side of zero, so as to produce a respective value of the extent of matching for each of said horizontal offsets;

selecting, for each sample of the line to be interpolated, from a plurality of gradient vectors each associated with a respective one of said different horizontal offsets, the gradient vector associated with the horizontal offset that produces the greatest extent of matching between said two blocks;

low pass spatially filtering the gradient vector selected for each sample of the line to be interpolated;

spatially interpolating between samples of said video signal in different lines thereof to generate samples of the interpolated line; and in said step of spatially interpolating, controlling the direction of interpolation for each sample generated in accordance with the gradient vector selected for said predetermined sample position corresponding to that generated sample.

16. Apparatus for spatially interpolating between lines of a digital video signal to produce interpolated lines, the apparatus comprising:

supersampling means operative to horizontally interpolate between samples of the video signal to produce a supersampled signal comprising the original samples and at least one interpolated sample located between each adjacent pair of original samples;

a plurality of block matching circuits each operative to determine, for each sample of the supersampled signal, the extent of matching between two blocks of N×M samples of the supersampled signal (where N is the number of lines and is equal to 3 and M is the number of samples), said two blocks being vertically offset from one another in opposite directions with respect to a line to be interpolated, and being horizontally offset from one another in opposite directions with respect to a predetermined sample position, each of said block matching circuits being operative to as set forth for a respective one of a plurality of different horizontal offsets, including zero offset and at least one offset on each side of zero, whereby a respective value of the extent of matching is produced for each of said horizontal offsets;

selector means responsive to said respective values produced by said block matching circuits to select, for each sample of the line to be interpolated, from a plurality of gradient vectors each associated with a respective one of said different horizontal offsets, the gradient vector associated with the horizontal offset that produces the greatest extent of matching between said two blocks;

a spatially interpolator operative to spatially interpolate between samples of said video signal in different lines thereof so as to generate samples of the interpolated line, the direction of interpolation of said spatial interpolator being variable; and means connecting said spatial interpolator to said selector means so that the direction of said interpolation of said spatial interpolator is controlled, for each sample generated thereby, in accordance with the gradient vector selected for said predetermined sample position corresponding to that generated sample.

17. Apparatus for spatially interpolating between lines of a digital video signal to produce interpolated lines, the apparatus comprising:

supersampling means operative to horizontally interpolate between samples of the video signal to produce a supersampled signal comprising the original samples and at least one interpolated sample located between each adjacent pair of original samples;

a plurality of block matching circuits each operative to determine, for each sample of the supersampled signal, the extent of matching between two blocks of N×M samples of the supersampled signal (where N is the number of lines and M is the number of samples), said two blocks being vertically offset from one another in opposite directions with respect to a line to be interpolated, and being horizontally offset from one another in opposite directions with respect to a predetermined sample position, each of said block matching circuit being operative to as set forth for a respective one of a plurality of different horizontal offsets, including zero offset and at least one offset on each side of zero, whereby a respective value of the extent of matching is produced for each of said horizontal offsets;

selector means responsive to said respective values produced by said block matching circuits to select, for each sample of the line to be interpolated, from a plurality of gradient vectors each associated with a respective one of said different horizontal offsets, the gradient vector associated with the horizontal offset that produces the greatest extent of matching between said two blocks;

a low pass spatial filter operative to filter the gradient vectors selected for successive samples;

a spatially interpolator operative to spatially interpolate between samples of said video signal in different lines thereof so as to generate samples of the interpolated line, the direction of interpolation of said spatial interpolator being variable; and means connecting said spatial interpolator to said selector means through said low-pass spatial filter so that the direction of said interpolation of said spatial interpolator is controlled, for each sample generated thereby, in accordance with the gradient vector selected for said predetermined sample position.

* * * * *